United States Patent

[11] 3,621,172

[72] Inventor Malcolm D. Clark
    Glasgow, Scotland
[21] Appl. No. 817,779
[22] Filed Apr. 21, 1969
[45] Patented Nov. 16, 1971
[73] Assignee Raymond Control Sytems, Inc.

[54] SWITCH-ACTUATING MEANS AND ADJUSTABLE CAMMING CONSTRUCTION
1 Claim, 2 Drawing Figs.
[52] U.S. Cl. .................................................. 200/153,
    287/52, 200/47, 200/56
[51] Int. Cl. ............................................... H01h 21/28
[50] Field of Search .................................. 200/47.16,
    153.19, 153.13, 61–86, 38, 56; 287/20.3, 52, 52.2

[56] References Cited
    UNITED STATES PATENTS
3,051,372  8/1962  Rockafield et al............  287/52 X
3,071,024  1/1963  Nipken......................  287/52
3,219,770  11/1965 Chasar......................  200/47
3,248,956  5/1966  Kuhn........................  200/153.13 X
2,540,444  2/1951  Harland.....................  200/56

Primary Examiner—Herman J. Hohauser
Attorney—Hill, Sherman, Meroni, Gross & Simpson ABSTRACT: Switch-actuating means employing an eccentric cam which is supported above a surface for rotational sliding engagement with the operating lever arm of a switch. The switch is carried above the surface on a mounting bracket which includes means for adjusting the position of the switch lever arm in the path of rotation of the cam, whereby the electrical condition of the switch corresponds to the desired rotational condition of the shaft on which the cam is carried for accurately controlling the prime mover of a valve so that the prime mover is deenergized upon operation of the valve thereby to an open or a closed condition.

PATENTED NOV 16 1971  3,621,172

INVENTOR.
Malcolm D. Clark
BY Hill, Sherman, Meroni, Gross & Simpson ATTORNEYS

SWITCH-ACTUATING MEANS AND ADJUSTABLE CAMMING CONSTRUCTION

BACKGROUND OF THE INVENTION

1. Field of the Invention

This invention relates to switching apparatus and is particularly concerned with the provision of switching apparatus wherein the electrical condition of a switch corresponds to the desired physical displacement of the switch operator.

2. Description of the Prior Art

Generally, flow control valves which are driven between fully open and fully closed conditions by means of an electric motor employ electrical circuitry coupled between the controlled valve and the motor for signalling to the motor when the valve reaches its fully open or fully closed condition. This electrical circuitry may take many forms, however, such circuitry generally includes some type of electrical switching apparatus which is electrically connected in the operating circuit of the driving motor to disconnect the motor from its power supply upon reaching the desired condition. Problems have arisen, however, with respect to the accurate detection of the desired physical displacement of the controlled element, particularly wherein the detection of the desired condition of the valve depends on accurate detection of the angular displacement of a rotary shaft. It is therefore highly desirable to provide apparatus which will accurately detect the angular displacement of a rotatary shaft wherein the apparatus provided is of low cost and is easily adjustable to compensate for manufacturing tolerances and valve wear.

SUMMARY OF THE INVENTION

Briefly, according to the invention there is provided for detecting the angular position of a rotatary shaft, a switch having an operating lever which is positioned in sliding contact with an eccentric cam carried by the rotatable shaft. To operate the switch, the cam is disposed on the shaft so that to switch is operated to one of its two states at one angular position of the shaft and to its opposite state at another angular position of the shaft. These two angular positions correspond to the open and closed conditions of the valve. It is difficult to position the switch in a fixed location for accurate initial operation on a mass assembly basis; further, after a certain number of valve operations the correct angular positions may alter due to break-in and wear of the valving components so that any initial switch position becomes inaccurate. Therefore, the switch, according to the present invention, is provided with means for adjusting its position relative to the cam including a pivotal mounting base for the switch and means for arcuately adjusting the position of the base about its pivot.

BRIEF DESCRIPTION OF THE DRAWINGS

The invention, its organization, construction and operation will be best understood by reference to the following detailed description thereof taken in conjunction with the accompanying drawings in which.

Figures 1, 2:
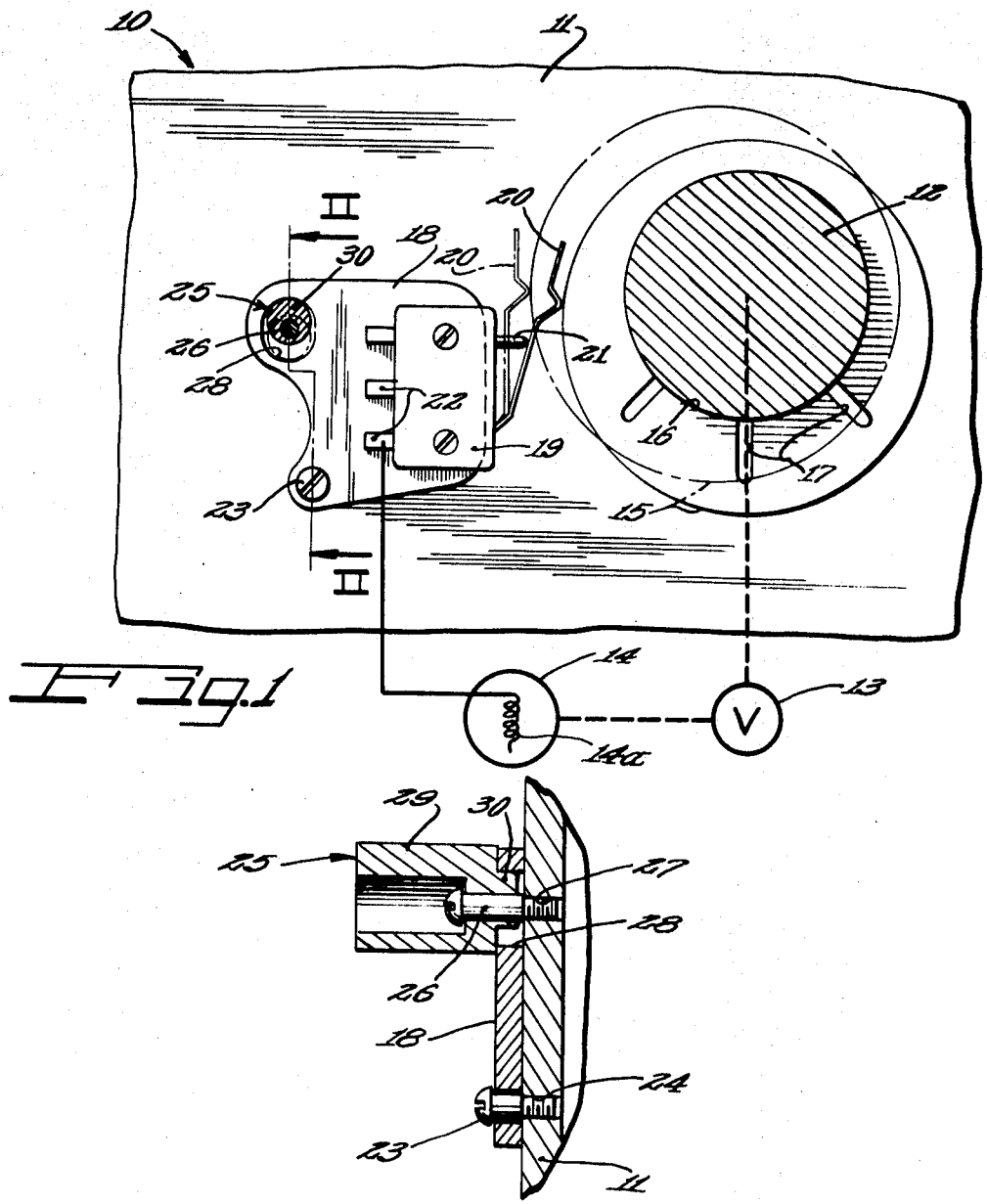
FIG. 1 is a plan view of switch actuating means and adjustable camming construction according to the present invention.
FIG. 2 is a partial sectional view of the switch camming construction taken along the line II—II of FIG. 1 DESCRIPTION OF THE PREFERRED EMBODIMENTS A switch operating and adjusting structure is generally shown at 10 as comprising a rotatable shaft means 12 carried above a mounting surface 11. A cam 15 includes an aperture 16 for receiving shaft 12. Attention is invited that cam 15 is preferably of a plastic material and includes slots 17 therein whereby cam 15 frictionally engages shaft 12 through a deformation of the cam permitted by the strain relief offered by slots 17. The cam 15 is therefore affixed to shaft 12 without the provision of additional fastening means, such as a key. The rotation of shaft 12 is indicated by the alternate position shown for cam 15.

Shaft 12 is connected to a flow control valve 13 and assumes an angular displacement corresponding to the condition of the valve as determined by the valve driving motor 14.

A mounting bracket 18 is disposed above the surface 11 and carries a switch 19 thereon. Switch 19 includes a lever arm 20, shown in its two fully operated states, which follows the movement of cam 15, and a switch plunger 21 which follows the movement of lever arm 20. Switch contacts (not shown) are mechanically coupled to plunger 21 and electrically connected to the output terminals 22 of the switch. The terminals 22 are connected to the energizing circuit of the motor 14, only one such connection being shown. Switch terminals 22 may be connected directly to the motor-energizing circuit, symbolized by winding 14a, or it may be operably connected to a relay in that circuit.

Mounting bracket 18 is pivotally connected to surface 11 by means of a machine screw 23. The positioning of bracket 18, and accordingly switch 19, relative the rotatable cam 15 is provided by a switch position adjusting apparatus 25. Adjusting apparatus 25 includes a machine screw 26 which engages a threaded aperture 27 in the surface 11 to mount a camming structure 29, including an eccentric camming portion 30 thereon, above the surface 11. Bracket 18 is provided with an elongate hole or slot 28, the edges of which act as a camming surface for eccentric camming portion 30, whereby a loosening of the machine screw 26 and rotation of element 29 counterclockwise as viewed in the drawing will adjust the switch at 19 and its lever arm 20 to the left in a direction away from the eccentric cam 15. By the same token, a clockwise rotation of element 29 will effect movement of switch 19 and lever arm 20 toward the cam 15. Therefore, apparatus 25 provides a means for adjusting the electrical condition of switch 19 with respect to the angular displacement of shaft 12. As previously mentioned, shaft 12 is coupled to the controlled valve 13 while switch 19 is connected via its terminals 22 to the prime mover 14 for driving the valve between its open and closed conditions.

Briefly, there has been described apparatus for use with a valve and a motor for driving the valve which is mechanically coupled to the valve and electrically connected to the motor for signalling the motor that the valve has been driven to its fully open or fully closed condition. Additionally, there has been provided apparatus for adjusting the points of signalling, that is, the operation of the switch so that the two possible switch conditions accurately correspond to the two extreme valve conditions and, accordingly, control the operation of the valve-driving motor.

Although the invention has been particularly set forth herein by way of a specific exemplary showing thereof, changes and modifications of the invention may be made by those skilled in the art without departing from the spirit and scope of the invention as defined in the appended claims.

The embodiments of the invention in which an exclusive property or privilege is claimed are defined as follows:

1. An electromechanical control apparatus comprising:
    mechanical control means including a movable control member which is positionable to first and second positions;
    electrical switching means having first and second electrical conditions corresponding to the first and second positions, respectively, of said movable member, including a movable switching member; and
    means for mounting said switching means with said movable switching member adjacent said movable control member for operable engagement thereby, said mounting means including
    a mounting surface,
    means for movably mounting said switching means including a base pivotally connected to said mounting surface to provide movement of said switching means along an arcuate path to adjust said movable switching member relative to said movable control member so that the operation of said switching means to said first and second electrical conditions may be varied relative to the first and second positions of said movable member, and
    means for selectively positioning said base about its pivot relative to said movable control member including wall means in said base defining an aperture through said base, and selective positioning means including a positionable cam pivotally carried on said mounting surface and disposed in said aperture, said cam being in constant abutment with said wall means and said wall means being in confining and surrounding relation to said cam to selectively and positively position said base and said electrical switching means relative to said control member.

* * * * *